United States Patent [19]

Goto

[11] Patent Number: 4,953,658
[45] Date of Patent: Sep. 4, 1990

[54] SEISMIC ISOLATOR

[75] Inventor: Yozo Goto, Tokyo, Japan

[73] Assignee: Ohbayashi Corporation, Osaka, Japan

[21] Appl. No.: 458,377

[22] Filed: Dec. 28, 1989

[30] Foreign Application Priority Data

Jun. 7, 1989 [JP] Japan ................... 1-143155

[51] Int. Cl.$^5$ .............................................. F16M 1/00
[52] U.S. Cl. ................... 181/207; 181/208; 248/638; 52/167 R; 267/136
[58] Field of Search ............... 181/207–209; 248/560, 566, 576, 599, 603, 605, 606, 614, 615, 638, 677; 52/167 R; 267/136

[56] References Cited

U.S. PATENT DOCUMENTS

| 4,121,393 | 10/1978 | Renault et al. | 52/167 R |
| 4,533,109 | 8/1985 | Delar | 248/566 X |
| 4,587,779 | 5/1986 | Staudocher | 248/560 X |
| 4,713,917 | 12/1987 | Buckle et al. | 52/167 R |
| 4,883,250 | 12/1989 | Yano et al. | 248/638 |

Primary Examiner—Benjamin R. Fuller
Attorney, Agent, or Firm—Wenderoth, Lind & Ponack

[57] ABSTRACT

A seismic isolator for absorbing earthquake vibrations is provided which comprises a laminated member arranged to be interposed between a structure and a foundation, the laminated member comprising thin steel sheets having concavities and convexities extending in a single direction, flexible sheets stacked alternately with the steel sheets, and upper and lower end plates, all these sheets and plates being unitarily and fixedly bonded together. The upper and lower end plates are fixed to the structure and the foundation, respectively, in such a manner that the concavities and convexities extend in a direction in which earthquake vibrations are to be isolated from the structure. The seismic isolator of the present invention is particularly suitable for use with a bridge.

8 Claims, 2 Drawing Sheets

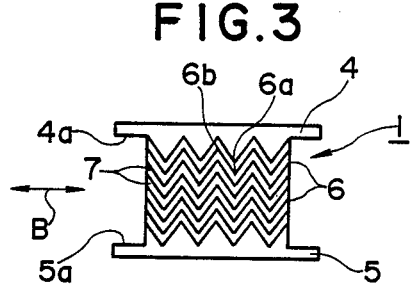
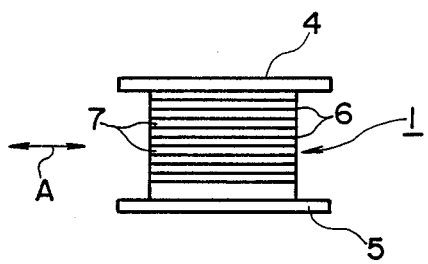
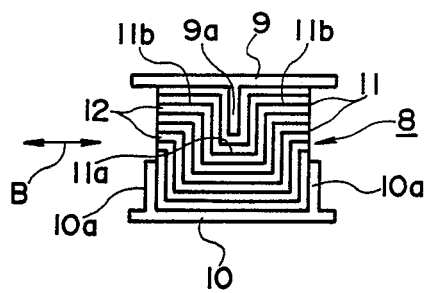
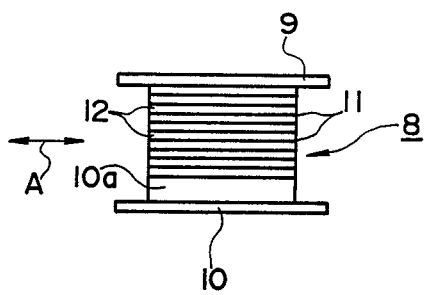

SEISMIC ISOLATOR

BACKGROUND OF THE INVENTION

1. Field of the Invention

The present invention relates to a seismic isolator which is interposed between a structure and its foundation to absorb and hence damp earthquake vibrations which are transmitted to the structure through the foundation and, more particularly, to a seismic isolator which absorbs and attenuates earthquake vibrations in a particular direction and is suitable for use with a bridge or similar structure.

2. Description of the Prior Art

Heretofore there has been known a seismic isolator of the type in which elastic laminated members are interposed between a structure and its foundation to support the vertical load of the structure so that external forces in the horizontal direction caused by earthquake are absorbed and attenuated by horizontal displacement of the elastic laminated members to buffer the earthquake vibrations.

The above-mentioned elastic laminated member is of a multi-layer structure comprising thin flat metal sheets and rubber sheets stacked alternately with each other and fixed together. The elastic laminated members are each fixedly secured at upper and lower ends to a building or similar structure and its foundation, respectively, and have the same rigidity, and consequently the same seismic isolating function, in any horizontal directions (Japanese Pat. Publication No. 34276/88).

It may sometimes be desirable, according to the kind of a structure, to attenuate earthquake vibrations only in a particular direction. For example, in the case of a bridge in which expansion joints are used, it is required to isolate vibrations only in the axial direction of the bridge (i.e. lengthwise direction thereof) but not to isolate vibrations in a direction perpendicular thereto. Consequently, when the above known seismic isolator is used with the bridge, stoppers must be provided in order to restrict the relative displacement of the bridge in a direction perpendicularly to the axis of the bridge.

SUMMARY OF THE INVENTION

It is therefore an object of the present invention to provide a seismic isolator which has a directionality in the isolation of earthquake vibrations and hence is free from the necessity of providing stoppers for limiting relative displacement of a structure in the direction in which the earthquake vibrations are not to be isolated, and which is particularly suitable for use with bridges and similar structures.

The seismic isolator of the present invention comprises a laminated member adapted to be interposed between a structure and foundation. The laminated member comprises thin steel sheets having concavities and convexities extending in a single direction, flexible sheets stacked alternately with the steel sheets, and upper and lower end plates, these sheets and plates being unitarily and fixedly bonded together. The upper and lower end plates are fixedly secured to the structure and the foundation, respectively, in such a manner that the concavities and convexities extend in a direction in which earthquake vibrations are to be isolated.

With the seismic isolator of the present invention, since the laminated member has a multi-layer structure in which thin steel sheets having concavities and convexities extending in the same direction and flexible sheets are alternately stacked one upon another, the laminated member is capable of large elastic or plastic deformation as a whole in the above-mentioned direction but is restricted from elastic or plastic deformation in a direction perpendicular thereto. Consequently, the seismic isolator of the present invention allows the structure installed on the foundation through the laminated member to be displaced relative to the foundation only in a single horizontal direction to isolate earthquake vibrations, but inhibits relative displacement of the structure in the direction perpendicular to that single horizontal direction.

The flexible sheets may preferably be formed of rubber or a viscoelastic material.

According to an aspect of the present invention, the thin steel sheets are corrugated steel sheets which have wavelike folds, that is, wavelike in section. In this instance, the concavities and convexities may either acute-angled or gently-rounded.

According to another aspect of the present invention, the thin steel sheets are each bent in a U-letter shape across its central portion, i.e. U-shaped in cross-section.

Other object, features and advantages of the present invention will become more apparent from the following description taken in conjunction with the accompanying drawings.

BRIEF DESCRIPTION OF THE DRAWINGS

FIG. 3 is a cross-sectional view illustrating an embodiment of an seismic isolator of the present invention;

FIG. 4 is a side view of the seismic isolator shown in FIG. 3;

FIG. 5 is a cross-sectional view illustrating another embodiment of an seismic isolator of the present invention; and FIG. 6 is a side view of the seismic isolator depicted in FIG. 5.

DESCRIPTION OF THE PREFERRED EMBODIMENTS

Figure 1:
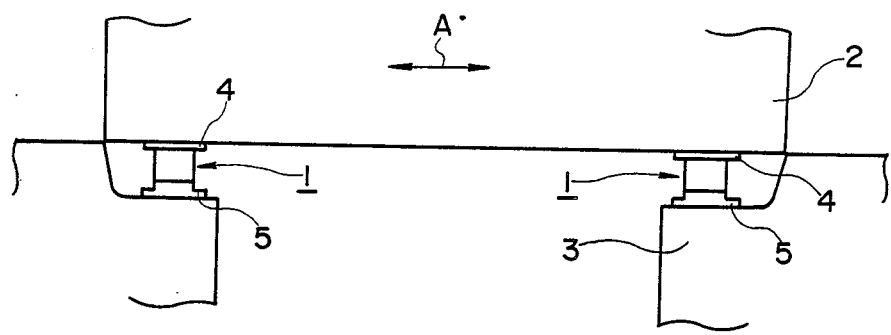
Fig. 1 is a side view schematically illustrating a bridge incorporating a seismic isolator of the present invention.

A description will be given first, with reference to FIGS. 1 through 4, an embodiment of seismic isolator of the present invention. As shown in FIG. 1, laminated members 1 are interposed between a bridge 2 and its foundation 3. Each laminated member 1 has such a structure as shown in FIG. 3, in which corrugated thin steel sheets 6 having convexities 6a and concavities 6b extending in parallel in the same direction and rubber sheets 7 are stacked alternately with each other and are sandwiched between top and bottom end plates 4 and 5 whose inner surfaces 4a and 5a are formed to conform to the corrugation of the thin steel sheets. The corrugated thin steel sheets 6, the rubber sheets 7 and the top and bottom end plates 4, 5 are bonded together as a unitary structure. The end plates 4 and 5 of the laminated member 1 are adapted to be fixedly secured by bolts or similar means to the bridge 2 and the foundation 3, respectively.

Viewed from one side of the laminated member 1, the top and bottom end plates 4, 5, the steel sheets 6 and the rubber sheets 7 are piled up linearly as depicted in FIG. 4. Viewed from the front of the laminated member 1, the steel sheets 6 and the rubber sheets 7 mate with each other along the same direction between the uneven inner surfaces 4a and 5a of the top and bottom end plates 4, 5 as depicted in Fig. 3. With such a structure, each rubber sheet 7 is allowed to be elastically deformed along the direction in which the concavities 6a and the convexities 6b of the corrugated steel sheets 6 extends, but is inhibited from elastic deformation in the direction perpendicular to the longitudinal direction of the concavities and convexities 6a, 6b. Consequently, the laminated member 1 can be largely deformed elastically in the longitudinal direction of the concavities and convexities 6a, 6b but can hardly be deformed elastically in the direction perpendicular to longitudinal direction of the concavities and convexities 6a and 6b.

Figure 2:
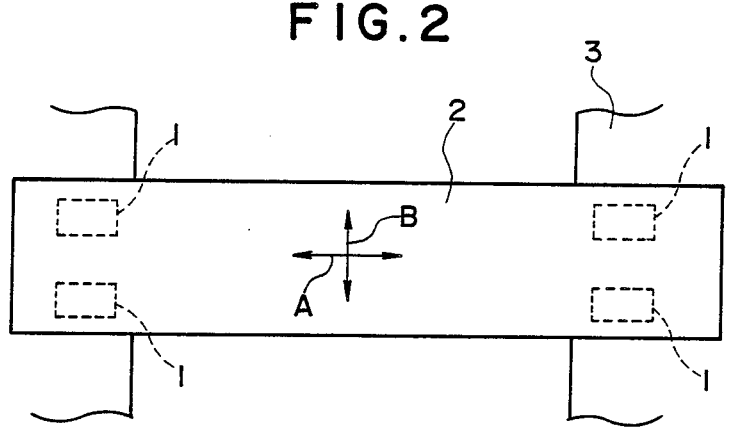
FIG. 2 is a schematic plan view of the bridge depicted in FIG. 1.

Each laminated member 1 is installed between the bridge 2 and the foundation 3 in such a manner that the concavities and convexities 6a, 6b of the corrugated steel sheets 6 extend along the axis of the bridge 2, i.e. in the direction of arrow A in FIGS. 1 and 4. By such an arrangement, vibrational component of earthquake along the axis of the bridge 2 can be absorbed and hence isolated from being transferred to the bridge 2 by displacing the bridge 2 axially relative to the foundation 3. On the other hand, the relative displacement of the bridge 2 in the direction at right angles to its axis, i.e. in the direction of the arrow B in FIGS. 2 and 3, is limited due to the restriction of elastic deformation of the laminated members 1 by the stopper effect of the corrugated thin steel sheets 6. Thus, the seismic isolator of the present invention permits the isolation of earthquake vibrations from the bridge 2 in its axial direction alone, and does not isolate the earthquake vibrations in the direction perpendicular to the axis of the bridge 2 without the need of providing stoppers separately. This allows simplification of construction of expansion joints used in the bridge 2.

While in the above embodiment the corrugated steel sheets 6 have the sharp or acute-angled concavities and convexities 6a and 6b, the concavities and convexities may also be rounded by bending steel sheets accordingly, though not shown. In the case of using corrugated thin steel sheets, the laminated member 1 can be formed by using a plurality of the corrugated thin steel sheets 6 of the same shape.

FIGS. 5 and 6 illustrate another embodiment of the seismic isolator of the present invention. In this embodiment thin steel sheet 11 of a laminated member 8 have concavities and convexities 11a and 11b formed by bending the sheets in a U-letter shape across their central portions, the concavities and convexities 11a and 11b extending in the same direction. The lower the steel sheet 11, the wider the concavity 11a, so that the steel sheets 11 and rubber sheets 12 can be stacked alternately with each other. It is therefore necessary to prepare a plurality of thin steel sheets of different cross-sections.

A top end plate 9 has a projection 9a extending from the underside thereof at its central portion, and the projection 9a is fitted into the concavity 11a of the uppermost steel sheet 11. On the other hand, a bottom end plate 10 has upward projections 10a formed integrally therewith and extending from marginal portions thereof in parallel to the projection 9a of the top end plate 9, for restricting end portions of the lowermost steel sheet 11 and rubber sheet 12. The laminated member 8, viewed from its one side, has a structure in which the top and bottom end plates 9 and 10, the thin steel sheets 11 and the rubber sheets 12 are flatly piled up as shown in FIG. 6.

The laminated member 8 is disposed with the concavities and convexities 11a and 11b of the steel sheets 11 extending along the axis of the bridge 2, i.e. in the direction of arrow A in FIG. 6. Consequently, for earthquake vibrations in the axial direction of the bridge 2, the laminated member 8 is deformed elastically to allow displacement of the bridge 2 relative to the foundation 3, thereby isolating the bridge 2 from the earthquake vibrations. However, for earthquake vibrations in the direction at right angles to the axis of the bridge 2 (in the direction of arrow B in FIG. 5), stopper effect of steel sheets 11 having the concavities and convexities 11a and 11b is produced to inhibit the deformation of the laminated member 8 and hence limit displacement of the bridge 2 relative to the foundation 3.

While in the illustrated embodiments, the laminated member 1 or 8 is an elastic laminated member formed by stacking the thin steel sheet 6, 11 and the rubber sheets 7, 12 alternately with each other, the invention is not limited specifically thereto but can also be achieved by use of a viscoelastic laminated member which employs viscoelastic material sheets in place of the rubber sheets. The viscoelastic material herein mentioned is a material which has both viscous and elastic resistances, such as a mixture of synthetic rubber and ferrite or similar additive.

As described above, according to the seismic isolator of the present invention, thin steel sheets having parallel concavities and convexities extending in a single direction and flexible material sheets are alternately laminated to form the laminated member so that its elastic or plastic deformation is restricted to the single direction, permitting isolation of earthquake vibrations in that particular direction alone. Consequently, a structure installed on the foundation through the laminated member is allowed to move relative to the foundation in only one horizontal direction and hence can be isolated from earthquake vibrations, and at the same time, relative displacement of the structure in the direction perpendicular to the above-mentioned direction can be inhibited without providing stoppers therefor. As will be appreciated from the above, the seismic isolator of the present invention is particularly suitable for use with a bridge for which horizontal earthquake vibrations are required to be absorbed and attenuated in only one direction.

It will be apparent that many modifications and variations may be effected without departing from the scope of the novel concepts of the present invention.

What is claimed is:

1. A seismic isolator comprising a laminated member adapted to be interposed between a structure and foundation, said laminated member comprising thin steel sheets having concavities and convexities extending in a single direction, flexible sheets stacked alternately with said steel sheets, and upper and lower end plates, said steel sheets, flexible sheets and upper and lower end plates being unitarily and fixedly bonded together, said upper and lower end plates being fixed to said structure and said foundation, respectively, in such a manner that said concavities and convexities extend in a direction in which earthquake vibrations are to be isolated from said structure.

2. A seismic isolator as claimed in claim 1 wherein said flexible sheet is formed of rubber.

3. A seismic isolator as claimed in claim 1, wherein said flexible sheet is formed of a viscoelastic material.

4. A seismic isolator as claimed in claim 1, wherein said concavities and convexities of said thin steel sheet are formed so that said thin steel sheet is wavelike in a section in a direction perpendicular to the direction of extension of said concavities and convexities.

5. A seismic isolator as claimed in claim 4, wherein said concavities and convexities are acute-angled.

6. A seismic isolator as claimed in claim 4, wherein said concavities and convexities are rounded.

7. A seismic isolator as claimed in claim 1, wherein said concavities and convexities of said thin steel sheet are formed by bending said thin steel sheet in a U-letter shape across its central portion.

8. A seismic isolator as claimed in claim 1, wherein said structure is a bridge.

* * * * *